US012599858B2

(12) United States Patent
Lykke et al.

(10) Patent No.: US 12,599,858 B2
(45) Date of Patent: Apr. 14, 2026

(54) PROCESS FOR THE REMOVAL OF PARTICULATE MATTER FROM AN AQUEOUS STREAM

(71) Applicant: TOPSOE A/S, Kgs. Lyngby (DK)

(72) Inventors: Mads Lykke, Brønshøj (DK); Lars Piilmann Brorholt, Melby (DK); Per Aggerholm Sørensen, Kgs. Lyngby (DK)

(73) Assignee: TOPSOE A/S, Kgs. Lyngby (DK)

( * ) Notice: Subject to any disclaimer, the term of this patent is extended or adjusted under 35 U.S.C. 154(b) by 813 days.

(21) Appl. No.: 17/787,712

(22) PCT Filed: Feb. 12, 2021

(86) PCT No.: PCT/EP2021/053458
§ 371 (c)(1),
(2) Date: Jun. 21, 2022

(87) PCT Pub. No.: WO2021/160804
PCT Pub. Date: Aug. 19, 2021

(65) Prior Publication Data
US 2022/0401863 A1     Dec. 22, 2022

(30) Foreign Application Priority Data
Feb. 14, 2020     (DK) ........................... PA 2020 00182

(51) Int. Cl.

| | |
|---|---|
| *B01D 39/20* | (2006.01) |
| *B01D 37/02* | (2006.01) |
| *B01D 39/16* | (2006.01) |
| *B01D 71/36* | (2006.01) |
| *B01J 20/14* | (2006.01) |
| *B01J 20/26* | (2006.01) |
| *B01J 20/28* | (2006.01) |
| *B01J 23/22* | (2006.01) |
| *C01B 17/79* | (2006.01) |
| *C01B 17/88* | (2006.01) |
| *C01B 17/90* | (2006.01) |

(52) U.S. Cl.
CPC ......... *B01D 39/2027* (2013.01); *B01D 37/02* (2013.01); *B01D 39/1692* (2013.01); *B01D 39/2017* (2013.01); *B01D 71/36* (2013.01); *B01J 20/14* (2013.01); *B01J 20/261* (2013.01); *B01J 20/28033* (2013.01); *B01J 23/22* (2013.01); *C01B 17/79* (2013.01); *C01B 17/88* (2013.01); *C01B 17/90* (2013.01); *B01D 2239/1216* (2013.01)

(58) Field of Classification Search
CPC ........... B01D 39/2027; B01D 39/1692; B01D 39/2017; B01D 37/02; B01D 71/36; B01J 20/14; B01J 20/261; B01J 20/28033; B01J 23/22; C01B 17/79; C01B 17/88; C01B 17/90
See application file for complete search history.

(56) References Cited

U.S. PATENT DOCUMENTS

| | | | |
|---|---|---|---|
| 4,405,548 A | 9/1983 | Cobb | |
| 4,702,836 A * | 10/1987 | Mutoh | B01D 67/003 |
| | | | 521/64 |
| 5,753,201 A * | 5/1998 | Lin | C01B 17/74 |
| | | | 423/532 |
| 6,287,534 B1 | 9/2001 | Lin | |
| 2018/0127271 A1 | 5/2018 | Lykke | |
| 2019/0085168 A1 * | 3/2019 | Webb | B01D 53/8625 |

FOREIGN PATENT DOCUMENTS

| | | |
|---|---|---|
| CN | 104843653 A | 8/2015 |
| EP | 0417200 B1 | 1/1994 |
| EP | 0419539 B1 | 2/1995 |
| EP | 1264916 A1 | 12/2002 |
| GB | 2394428 A | 4/2004 |
| JP | S5424297 A | 2/1979 |
| JP | 2018532570 A | 11/2018 |
| WO | 2016169822 A1 | 10/2016 |
| WO | 2017076673 A1 | 5/2017 |
| WO | 2018108739 A1 | 6/2018 |

OTHER PUBLICATIONS

Rubow et al.,—Sintered porous metal filtration systems ..—(Apr. 9-12, 2002), Mott Co. (Year: 2002).*
Danish Search Report dated Jul. 1, 2020 by the Danish Patent and Trademark Office in corresponding Danish Patent Application No. PA 2020 00182. (9 pages).
International Search Report (PCT/ISA/210) and Written Opinion (PCT/ISA/237) mailed on Apr. 23, 2021, by the European Patent Office as the International Searching Authority for International Application No. PCT/EP2021/053458. (12 pages).
Notice of Reasons for Refusal for Application No. JP 2022-548866 dated Feb. 12, 2025, 8 pages.
Office Action in Canadian Application No. 3,168,609, mailed on Feb. 3, 2026 (5 pages).

* cited by examiner

*Primary Examiner* — Yong L Chu
(74) *Attorney, Agent, or Firm* — Boone IP Law

(57) ABSTRACT

Process for the removal of particulate matter from an aqueous stream containing a concentrated acid, preferably concentrated sulfuric acid, the process including mechanical filtration by passing the aqueous stream through a filter unit, the filter unit including a metallic, ceramic or polymeric filter, or a filter including a filter aid on a septum. The aqueous stream is the exit stream of a sulfuric acid condenser, optionally the exit stream of a sulfuric acid concentrator arranged downstream the sulfuric acid condenser.

17 Claims, No Drawings

PROCESS FOR THE REMOVAL OF PARTICULATE MATTER FROM AN AQUEOUS STREAM

FIELD OF THE INVENTION

The present application is directed to the removal of particulate matter from an aqueous stream containing a concentrated acid, in particular concentrated sulfuric acid ($H_2SO_4$) having 60% wt. $H_2SO_4$ or more, such as 85% wt. or more, while the average particle size of the particulate matter is in the range 0.05-10 µm, such as 0.1-5 µm. The particulate matter is removed by means of mechanical filtration by passing said aqueous stream through a filter unit comprising a metallic, ceramic or polymeric filter or a filter comprising a filter aid on a septum, the septum preferably being a polymeric, ceramic or steel material. Embodiments of the invention include the metallic filter or the filter aid on septum having a filter media grade in the range 0.1-14 µm, preferably 0.5-12 µm. The concentrated sulfuric acid stream is produced in a plant for the treatment of a process gas stream containing sulfur, particularly in the form of sulfur dioxide ($SO_2$) and said particulate matter. The process gas stream is particularly the off-gas stream of a carbon black plant.

BACKGROUND OF THE INVENTION

Wet gas sulfuric acid (WSA) plants are currently used for treating off-gases, i.e. exhaust gases, emitted from carbon black plants. The off-gas contains sulfur in the form of $SO_2$, $NO_x$ and particulate matter in the form of soot, especially carbon black particulates. In a WSA plant, a process gas stream containing sulfur in the form of $SO_2$ and particulate matter is passed through a $SO_2$-converter comprising one or more beds of $SO_2$ oxidation catalyst. The $SO_2$ oxidation catalyst typically comprises vanadium as $V_2O_5$, sulfur in the form of sulfate, pyrosulfate, tri- or tetrasulfate, $SiO_2$ and alkali metals such as Li, Na, K, Rb and Cs, and combinations thereof as promoters, typically as a melt on a support of diatomaceous earth or $SiO_2$. In the $SO_2$-converter, the $SO_2$ of the process gas is converted to $SO_3$, and subsequently the gas is reacted with water to produce concentrated sulfuric acid in a sulfuric acid condenser. The sulfuric acid is also condensed as a liquid in the sulfuric acid condenser. The WSA plant may also optionally be equipped with Selective Catalytic Reduction (SCR) catalyst for removal of nitrogen oxides ($NO_x$). Reference is given to Applicant's WO 2016/169822, EP 0417200 and EP 0419539, which describe this process in detail.

While the vast majority of the carbon black particulates are oxidized on the $SO_2$ oxidation catalyst, minor amounts i.e. in concentrations from 0.002 mg/Nm$^3$ to 100 mg/Nm$^3$, such as from 0.003 mg/Nm$^3$ to 25 mg/Nm$^3$ or from 0.004 mg/Nm$^3$ to 10 mg/Nm$^3$ may penetrate the catalyst bed and end up in the produced sulfuric acid, making it gray/black. In other words, carbon black will be washed out with the produced sulfuric acid, which will therefore become contaminated and loose its commercial value.

It is known to use chemical treatment with strong oxidative agents such as hydrogen peroxide ($H_2O_2$), ozone ($O_3$) and similar for oxidizing carbon particles, thereby removing the undesired color and thus also the contamination of the acid by such particles. Thus, "Handbook of sulfuric acid manufacturing" devotes a section to this topic (Sulphuric Acid Decolourization, 1$^{st}$ ed. 2008), with the main focus being bleaching via the use of strong oxidative agents; see in particular pages 7-15 therein. The undesired color is stated as the result of unburned organics carried out in the off-gases of the plant producing sulfuric acid. It is also known to use so-called Dual Drying Tower technology for dealing with the issue of the coloured (contaminated) acid, as also is the use of activated carbon. The use of activated carbon is said to function by either adsorption, mechanical filtration, or ion exchange. Accordingly, mechanical filtration is disclosed only in connection with the use of activated carbon and for the removal of undesired color generated by the carry-over of unburned organics in a plant producing sulfuric acid.

U.S. Pat. No. 4,702,836 discloses a porous membrane which makes it possible to carry out highly precise filtration purification such as thermal conc. sulfuric acid filtration.

GB 2394428 A discloses a metallic filtration material comprising a protective coating of ceramic, silica or metallic material. The metallic filtration material is used for removal or recovery of particulates from gas and liquid flows and is coated with the protective material to reduce degradation during use.

U.S. Pat. No. 4,405,548 discloses an improved method for filtering molten polymeric material, where a filter bed of permeable ceramic material is used. The ceramic material comprises microcrystalline sintered bauxite particles.

EP 1264916 A1 discloses a method of suppressing corrosion of stainless steels or carbon steels exposed to environments of sulfuric acid or sulfuric acid-containing solution, by bringing a noble metal such as platinum, gold or silver, into contact with a portion of the stainless steel.

U.S. Pat. No. 6,287,534 discloses a a method for accelerating chemical reactions by high time rates of temperature change, and more particularly, to a method for employing rapid temperature change in one direction to accelerate the oxidation of polyatomic molecules such as $SO_2$, CO, $H_2S$, $H_2$, $NO_x$, $N_2$, $Cl_2$, $Br_2$, nonhydrocarbon-based volatile organic compounds, hydrocarbon-based volatile organic compounds, and aryl- and akyl-acid halides, We have found that when using a particular form of mechanical filtration in which a filter unit comprising a metal, ceramic or polymeric filter, or a filter comprising a filter aid on a septum, is applied, it is now possible to remove particulate matter, particularly carbon from concentrated acid, without using expensive materials such as activated carbon, or oxidizing agents, thereby significantly improving safety during operation, as no gases are formed during the filtration. In addition, side reactions and attendant byproducts normally formed during the use of bleaching (oxidative) agents, is also avoided.

Accordingly, the invention provides a process for the removal of particulate matter from an aqueous stream containing a concentrated acid, preferably concentrated sulfuric acid, wherein the average particle size of said particulate matter is in the range 0.05-10 µm, and the concentration of the sulfuric acid in said aqueous stream is above 60% wt., said process comprising mechanical filtration by passing said aqueous stream through a filter unit, and said filter unit comprising a metallic, ceramic or polymeric filter or a filter comprising a filter aid on a septum, wherein the aqueous stream is the exit stream of a sulfuric acid condenser, optionally the exit stream of a sulfuric acid concentrator arranged downstream the sulfuric acid condenser, of a process plant for producing sulfuric acid from a process gas stream, said process gas stream containing sulfur and said particulate matter, said process plant including: converting the sulfur in the form of $SO_2$ of said process gas stream into a $SO_3$-rich gas stream in a $SO_2$-conversion unit, said $SO_2$- conversion unit comprising a catalyst bed and passing said process gas through said catalyst bed; converting the $SO_3$-rich gas stream into said exit stream of the sulfuric acid condenser or said exit stream of said sulfuric acid concentrator; and optionally providing an acid cooling step for reducing the temperature of said exit stream.

Accordingly, said process plant may include a sulfuric acid concentrator arranged downstream said sulfuric acid condenser for increasing the concentration for the sulfuric acid in the exit stream from the sulfuric acid condenser. In a particular embodiment, said sulfuric acid concentrator may be integrated with the sulfuric acid condenser or separated from the sulfuric acid condenser.

By the term "integrated" is meant that the inlet of the sulfuric acid concentrator is in fluid communication with the outlet of the sulfuric acid condenser. Thus, sulfuric acid being condensed in the sulfuric acid condenser flows directly into e.g. the top of the sulfuric acid concentrator.

By the term "separated" is meant that the sulfuric acid concentrator is installed in an external vessel to the sulfuric acid condenser. For instance, the sulfuric acid being condensed in the sulfuric acid condenser is pumped to inlet the sulfuric acid concentrator which is installed in an external vessel.

It would be understood that when referring to the $SO_3$-rich gas stream being converted into said (aqueous) exit stream of e.g. said sulfuric acid condenser, a gaseous exit stream containing non-condensable compounds such as nitrogen, oxygen and carbon dioxide, is also formed.

The acid cooling step may comprise heat exchange between the sulfuric acid and a cooling medium, such as water or air, or an acid cooling circuit, for instance by heat exchange with a cold acid feed, e.g. recirculated cold acid feed. For details about the acid cooling circuit, reference is given to e.g. Applicant's patent application WO 2018/108739.

In an embodiment, said filter unit is provided downstream the acid cooling step. This particular positioning outside the acid cooling step of the filter unit, i.e. filtration equipment, enables the use of simpler or cheaper materials due to the lower temperature, i.e. about 40° C. at this position. For instance, the filter unit is provided downstream a cooling unit such as a heat exchanger for reducing the temperature of the sulfuric acid, prior to being pumped to a storage tank. The filter unit can have its own pump for overcoming the pressure loss across the filter or use existing pressure provided by a pump outside the filter unit.

In another embodiment, said filter unit is provided inside the acid cooling step as part of or integrated within the acid cooling circuit i.e. acid cooling loop. It would be understood, that the term "part of or integrated" signifies that "part of" and "integrated" have the same meaning. It has been found that although the temperature at this position is higher, i.e. the temperature inside the acid cooling loop is about 70° C., this reduces the viscosity by 50% compared to the 40° C. outside the loop (downstream the acid cooling step). The pressure drop is therefore only half of that outside the loop, thereby enabling a more expedient filter operation. For instance also, said filter unit is provided in said exit stream, e.g. prior to any cooling.

The term "acid cooling loop" refers to a recirculation loop in which the (aqueous) exit stream from the sulfuric acid condenser or sulfuric acid concentrator, having e.g. a temperature in the range 180-270° C. is first blended with a cooled recycle sulfuric acid stream having e.g. a temperature of about 40° C. The blended sulfuric acid, now having a temperature of about 70° C. is pumped and cooled in a heat exchanger thereby generating a cooled sulfuric acid stream having a temperature of about 40° C. A portion of this cooled sulfuric acid stream is split into the above cooled recycle sulfuric acid stream, and into an export sulfuric acid stream also having a temperature of about 40° C. and which is withdrawn outside the loop. Accordingly, the filter unit is suitably provided as part of or integrated in the acid cooling loop, in the blended sulfuric acid stream, for instance after said pumping, where the temperature of the sulfuric acid is about 70° C., as described farther above. The filter unit is also suitably provided outside the loop, in the export sulfuric acid stream, where the temperature of the sulfuric acid is about 40° C., as also described above.

The sulfuric acid concentrator may include a recirculation loop, i.e. a sulfuric acid concentrator recirculation loop, and which refers to the recycling of a portion of the exit stream of the sulfuric acid concentrator to e.g. the inlet of the sulfuric acid concentrator. The sulfuric acid recirculation loop may include heating of said portion of the exit stream, for instance heating to about 180-270° C. before entering the sulfuric acid concentrator.

As used herein, the term "average particle size" means the average diameter of the particles as measured by a laser diffraction particle size analyzer, such as a Malvern Mastersizer 3000.

As used herein, the term "particulate matter" means particles which impart an undesired effect in a concentrated acid. A specific example is carbon particles, in particular carbon black particles, that impart an undesired coloration in a concentrated acid. Particulate matter, as used herein includes soot, which is the common term for impure carbon particles as a result of incomplete combustion of hydrocarbons. As used herein, the term "carbon black" means a form of paracrystalline carbon that has a high surface area-to-volume ratio, albeit lower than that of activated carbon, and is dissimilar to ordinary soot in its much higher surface area-to-volume ratio, higher carbon concentration e.g. >95% wt. such as 97 or 99.0% wt., and significantly lower polycyclic aromatic hydrocarbon (PAH) content.

As used herein, the term "filter aid" means one or more inert materials, which are applied to a substrate for aiding filtration. A filter aid is an inert material typically contributing to formation of a porous filter cake, and may comprise materials such as diatomaceous earth, perlite, silica or alumina.

As used herein, the term "diatomaceous earth" means a material made from siliceous sedimentary rock having a composition of 80-90 wt % silica, 2-4 wt % alumina and 0.5-2 wt % iron oxide (composition of oven-dried diatomaceous earth).

As used herein, the term "septum" means a substrate or substrate layer on which the filter aid e.g. diatomaceous earth is applied or coated, and which is permeable to sulfuric acid.

In an embodiment, the metallic, ceramic or polymeric filter or the filter comprising a filter aid on a septum has a filter media grade of 0.1 to 14 μm, preferably 0.5 to 12 μm. It was found that particularly a ceramic or polymeric filter, or a filter comprising a filter aid on a septum, having a media grade of 15 μm or higher allowed the carbon black to pass through with the aqueous stream, whereas a denser filter such as one having a filter media grade of 14 μm, 12 μm, 10 μm or much lower such as 1 or 0.5 or 0.1 μm, in particular the range 0.1-14 μm or 0.5-12 μm, would remove the particulate matter efficiently, albeit with some increase in pressure drop.

As used herein, the term "filter media grade" or "media grade" means the average diameter of the pores in the filter as determined dynamically by forcing air through the filter just immersed in water until a bubble goes through. The pressure required correlates with the average pore size in the filter: pore diameter (microns)=30* surface tension (dynes/cm)/pressure (mm HG). The average diameter of the pores may alternatively be measured by electron microscopy.

The metallic, ceramic or polymeric filter, or the filter comprising a filter aid on a septum may be provided in the form of discs, rectangular or quadratic sheets, or as tubular or candle filters or pleated filter.

The septum may also be in the form of discs, rectangular or quadratic sheets, tubular or candle or pleated.

In an embodiment, the metallic filter is a sintered metal and the filter media grade is in the range 3-7 μm, preferably 5 μm. It was found that for this particular filter at this specific range, carbon black particles were removed efficiently and without substantially increased pressure drop.

Preferably, the sintered metallic filters have a thickness in the range of 0.2 to 10 mm, such as 1 to 2.5 mm.

Preferably, said metal is stainless steel, e.g. stainless steel 316 L or C22. In a particular embodiment, the metal is coated with an acid resistant material.

In an embodiment, the septum is a polymeric, ceramic or steel material, and the filter aid comprises diatomaceous earth. In a particular embodiment the filter aid is diatomaceous earth.

In an embodiment, the ceramic of said ceramic filter or said septum comprises one or more elements taken from the group comprising aluminum, calcium, potassium, sodium, magnesium, tungsten, iron, and silicon, in particular glass fiber or sintered glass such as fused silica; and the polymeric material of said polymeric filter or said septum is polypropylene, a fluorinated polymer such as tetrafluoroethylene e.g. polytetrafluoroethylene (PTFE), polyvinyl chloride, polyphenylene sulfide, polyphenylene oxide, or combinations thereof.

The same ceramic material may be used for the ceramic filter and the septum. The same polymeric material may be used for the polymeric filter and the septum.

The steel material of the septum is also preferably stainless steel, e.g. stainless steel 316 L or C22.

In an embodiment, the ceramic filter is glass fiber or sintered glass such as fused silica, with a filter media grade in the range 1-10 μm. Also for this particular filter at this specific range, carbon black particles were removed efficiently and without substantially increased pressure drop.

The filter unit may operate by gravity where the gravitational force is utilized to allow the fluid to travel downwards, vacuum where an apparatus is applied for creating a pressure gradient across the filter, forced filtration where the liquid is forced through the filter by an apparatus or the line pressure, or by centrifugal force applied by for example a rotating drum.

The filter unit may also comprise one or more filters in-series, in order to remove the coarse particulates first and minimize the total pressure drop.

The filter unit may also comprise one or more filters in parallel, thereby enabling operation of a filter while another filter is being cleaned or replaced.

The invention encompasses also the use of single-use cartridges or filters that can be cleaned, either manually or on-line, e.g. by forcing the filtrated liquid back through the filter for removing the deposited particulate matter. The cleaning process may also involve removing the deposited particulate matter, plus any filter aid.

In an embodiment, the polymeric material of said polymeric filter is PTFE. In a particular embodiment, the polymeric filter is a PTFE membrane, such as a PTFE membrane or ePTFE membrane, optionally pleated, and optionally also in a propylene housing to form a filter cartridge. The filter media grade, herein also referred as "pore rating" is suitably in in the range 0.02 to 5 μm, for instance 0.1, 0.2, 0.45 and 1.0 μm. —The length of the filter cartridge is for instance 1016 mm (40 inches) or 254 mm (10 inches) with an outer diameter of 70 mm.

The term "ePTFE membrane" means expanded polytetrafluoroethylene, which is a membrane generated from the expansion of the linear polymer PTFE, thereby creating a microporous structure.

In an embodiment, the average particle size of said particulate matter is in the range 0.1-5 μm, such as 0.1-2 μm.

In an embodiment, the content of particulate matter in the aqueous stream is 0.1-500 ppm-wt, preferably 0.3-250 ppm-wt, such as 100 ppm-wt.

In an embodiment, the particulate matter is soot.

In an embodiment, the particulate matter is carbon black.

In an embodiment, said process gas stream contains $O_2$ and more than 200 ppm vol $SO_2$, such as more than 500 ppm vol $SO_2$ (thus, the sulfur in the process gas is mainly in the form of $SO_2$), together with said particulate matter, wherein said particulate matter is soot and/or carbon black which is present in said process gas stream in a concentration of >2 mg/Nm$^3$. Preferably, in the process gas the soot has a composition comprising >20 wt % C (carbon), such as >50 wt % C, or >75 wt % C, or >90 wt % C, or >95 wt % C.

In an embodiment, the process gas stream is off-gas from a carbon black producing plant. In particular embodiment, the WSA plant is preferably integrated into said carbon black producing plant or provided as an extension of said carbon black producing plant for the treatment of the off-gas.

In an embodiment, said catalyst bed of said $SO_2$-conversion unit comprises a catalyst comprising vanadium pentoxide, sulfur in the form of sulfate, pyrosulfate, tri- or tetra-sulfate, and one or more alkali metals on a porous carrier, wherein the vanadium pentoxide content in the catalyst is 1-15 wt %, the sulfur content in the catalyst is 1-25 wt %, and the alkali metal in the catalyst is 2-25 wt %, and wherein the porous carrier is diatomaceous earth or silica i.e. silicon dioxide, optionally containing up to 10 wt % alumina.

In an embodiment, the concentration of the sulfuric acid in said aqueous stream is 85% wt. or higher (mass fraction of $H_2SO_4$). This is the concentration of the acid that is obtained in a WSA plant.

EXAMPLES

Example 1: Metallic and Ceramic Filters

Commercial metallic and ceramic filter samples of varying media grade were obtained.

Previous experiments have shown that the behavior of carbon black particles in sulfuric acid and water is similar, both are polar liquids that will not react with the carbon black particulates and their interactions with the carbon black particulate will therefore be identical. Thus, a suspension based on carbon black and water was used for the filtration tests.

A suspension of 100 ppm wt. carbon black in water was prepared by mixing carbon black powder with water on a dissolver.

Sintered metal filter discs of varying filter grade were acquired from Mott. The discs had a diameter of 1 inch (25.4 mm) and were manufactured from stainless steel 316 L. The ceramic discs tested were acquired from Sigma Aldrich and comprised glass fiber and sintered glass filters in the form of fused silica.

| Filter # | Type | media grade [μm] | Thickness [mm] | Particulate removal efficiency [%] |
|---|---|---|---|---|
| 1 | Sintered metal | 0.2 | 1.0 | >99.99 |
| 2 | Sintered metal | 0.5 | 1.2 | >99.9 |
| 3 | Sintered metal | 1 | 1.6 | >99.9 |
| 4 | Sintered metal | 2 | 1.6 | 99.9 |
| 5 | Sintered metal | 5 | 1.6 | 99.2 |
| 6 | Sintered metal | 10 | 1.6 | 48.6 |
| 7 | Sintered metal | 20 | 1.6 | 16.7 |
| 8 | Sintered metal | 40 | 2.0 | 7.2 |
| 9 | Sintered metal | 100 | 2.4 | 6.1 |
| 10 | Glass fiber | 1 | 0.7 | 99.5 |
| 11 | Fused silica | 10 | 4.0 | 97.0 |
| 12 | Fused silica | 16 | 4.0 | 60.5 |

All filter tests were performed by placing the filter samples in a custom-made funnel that was placed in a 1 L Büchner flask.

Subsequently, the 100 ppm wt carbon black suspension was poured on the filter and sucked through the filter by a pump providing a trans-filter pressure difference of 0.6 bar. For filter 1 to 3 and 11 to 12, the applied trans-filter pressure was 0.8 bar. The liquid passing through the filter was collected and subjected to determination of the obscuration using a Malvern Mastersize 3000. A standard curve for the obscuration was established by measuring the obscuration for known concentrations of carbon black suspensions in water.

It was observed that particularly ceramic or polymeric filters having a media grade of 15 μm or higher allowed the carbon black to pass through with the aqueous stream whereas a denser filter such as one having a filter media grade of 14 or 12 or 10 μm or much lower such as 1 or 0.5 or 0.1 μm, in particular the range 0.1-14 μm or 0.5-12 μm, would remove the particulate matter efficiently, albeit with some increase in pressure drop.

When using the metallic filter in the form of a sintered metal with filter media grade in the range 3-7 μm, in particular 5 μm, high particulate removal efficiency was observed (as shown in the Table), without significant penalties in terms of pressure drop.

When using the ceramic filter in the form of sintered glass, particularly fused silica, and with a filter media grade in the range 1-10 μm, high particulate removal efficiency was also observed without significant penalties in terms of pressure drop.

The term "particulate removal efficiency" represents the percentage of the carbon black in the suspension retained by the filter, calculated by converting the obscuration to wt-ppm by the standard curve.

Example 2: Polymeric Filters

Commercial cartridge filters (filter cartridges) with three different filter media grades, herein also referred as pore ratings, were obtained. The filters were tested in the laboratory to determine their particulate removal efficiency when removing carbon black from a test liquid.

The cartridge filters consist of a pleated ePTFE membrane housed in a polypropylene housing. Three different filter media grades (pore ratings) were supplied: 1.0, 0.45, and 0.2 μm. The filters were 254 mm (10") in length with an outer diameter of 70 mm. Two different measurements were done on the filtrate following a filtration test; determination of the particle size distribution and determination of the remaining carbon black content. Both measurements were carried out using a Malvern Mastersizer 3000.

The particle size distribution was measured for the filtrate from the filter cartridges with a pore rating of 1.0 and 0.45 μm, as well as 0.2 μm pore rating. In both cases the size distribution of the carbon black remaining in the filtrate was below the pore rating, confirming that the filter cartridges can remove carbon black particles at least down to their pore rating. The filtrate from the filter cartridge with a pore rating of 0.2 μm was clear enough that it was not possible to measure a particle size distribution.

The particle size distribution was measured for the filtrate from the filter cartridges with a 1.0 and 0.45 μm pore rating. In both cases the size distribution of the carbon black remaining in the filtrate was below the pore rating, confirming that the filter cartridges can remove carbon black particles at least down to their pore rating. The filtrate from the filter cartridge with a pore rating of 0.2 μm was clear enough that it was not possible to measure a particle size distribution.

The tests show that the cartridge filters are efficient at removing carbon black particles down to the above pore rating of the individual filters. The tests also confirmed that nearly all the carbon black needs to be removed for the liquid to be visibly clear.

The invention claimed is:

1. A process for the removal of particulate matter from an aqueous stream containing sulfuric acid, wherein an average particle size of said particulate matter is in the range 0.05-10 μm, and a concentration of the sulfuric acid in said aqueous stream is above 60% wt., said process comprising:

mechanical filtration by passing said aqueous stream through a filter unit, said filter unit comprising a metallic, ceramic, or polymeric filter, or a filter comprising a filter aid on a septum, wherein the aqueous stream is the exit stream of a sulfuric acid condenser, optionally the exit stream of a sulfuric acid concentrator arranged downstream the sulfuric acid condenser, of a process plant for producing sulfuric acid from a process gas stream, said process gas stream containing sulfur and said particulate matter, said process plant including:

converting the sulfur in the form of $SO_2$ of said process gas stream into a $SO_3$-rich gas stream in a $SO_2$-conversion unit, said $SO_2$-conversion unit comprising a catalyst bed and passing said process gas stream through said catalyst bed;

converting the $SO_3$-rich gas stream into said exit stream of said sulfuric acid condenser, optionally said exit stream of said sulfuric acid concentrator; and optionally providing an acid cooling step for reducing the temperature of said exit stream.

2. The process according to claim 1, wherein the process plant comprises the acid cooling step, wherein said filter unit is provided:

downstream the acid cooling step; or inside the acid cooling step as part of or integrated within an acid cooling circuit.

3. The process according to claim 1, wherein the metallic, ceramic or polymeric filter, or the filter comprising a filter aid on a septum, has a filter media grade of 0.1 to 14 μm.

4. The process according to claim 1, wherein the filter unit comprises the metallic filter, wherein the metallic filter is a sintered metal and the filter media grade is in the range 3-7 μm.

5. The process according to claim 1, wherein the filter unit comprises the filter comprising a filter aid on a septum, wherein the septum is a polymeric, ceramic or steel material and the filter aid comprises diatomaceous earth.

6. The process according to claim 1, wherein the ceramic of said ceramic filter or said septum comprises one or more elements taken from the group comprising aluminum, calcium, potassium, sodium, magnesium, tungsten, iron, and silicon; and the polymeric material of said polymeric filter or said septum is polypropylene, a fluorinated polymer, polyvinyl chloride, polyphenylene sulfide, polyphenylene oxide, or combinations thereof.

7. The process according to claim 6, wherein the polymeric material of said polymeric filter is PTFE and the polymeric filter is a PTFE membrane, optionally pleated, and optionally also in a propylene housing to form a filter cartridge.

8. The process according to claim 1, wherein the average particle size of said particulate matter is in the range 0.1-5 μm.

9. The process according to claim 1, wherein the content of particulate matter in the aqueous stream is 0.1-500 ppm-wt.

10. The process according to claim 1, wherein the particulate matter is soot.

11. The process according to claim 1, wherein the particulate matter is carbon black.

12. The process according to claim 1, wherein said process gas stream contains $O_2$ and more than 200 ppm vol $SO_2$ together with said particulate matter, wherein said particulate matter is soot and/or carbon black which is present in said process gas stream in a concentration of >2 $mg/Nm^3$.

13. The process according to claim 1, wherein the process gas stream is off-gas from a carbon black producing plant.

14. The process according to claim 1, wherein said catalyst bed of said $SO_2$-conversion unit comprises a catalyst comprising vanadium pentoxide, sulfur in the form of sulfate, pyrosulfate, tri-or tetrasulfate, and one or more alkali metals on a porous carrier, wherein the vanadium pentoxide content in the catalyst is 1-15 wt %, the sulfur content in the catalyst is 1-25 wt %, and the alkali metal in the catalyst is 2-25 wt %, and wherein the porous carrier is diatomaceous earth or silica, optionally containing up to 10 wt % alumina.

15. The process according to claim 1, wherein the concentration of the sulfuric acid in said aqueous stream is 85% wt. or higher.

16. A process comprising:
(a) producing an aqueous stream comprising sulfuric acid and particulate matter from a process gas stream, the process gas stream comprising sulfur and the particulate matter, the producing comprising:
(i) passing the process gas stream through a $SO_2$-conversion unit comprising a catalyst bed and converting the sulfur, in the form of $SO_2$, of the process gas stream into a $SO_3$-rich gas stream;
(ii) converting the $SO_3$-rich gas stream into an exit stream of a sulfuric acid condenser;
(iii) optionally, passing the exit stream through a sulfuric acid concentrator; and
(iv) optionally, providing an acid cooling step for reducing the temperature of the exit stream, wherein the aqueous stream is the exit stream of a sulfuric acid condenser, optionally after passing through the sulfuric acid concentrator and/or the acid cooling step,
(b) mechanical filtering of the aqueous stream by passing the aqueous stream through a filter unit, and said filter unit comprising:
(i) a metallic, ceramic or polymeric filter; or
(ii) a filter comprising a filter aid on a septum,
wherein an average particle size of the particulate matter is in the range 0.05-10 μm, and a concentration of the sulfuric acid in the aqueous stream is above 60% wt.

17. The process according to claim 16, wherein the process gas stream contains $O_2$ and more than 200 ppm vol $SO_2$ together with the particulate matter, wherein the particulate matter is soot and/or carbon black which is present in the process gas stream in a concentration of >2 $mg/Nm^3$.

* * * * *